(12) United States Patent
Gupta et al.

(10) Patent No.: US 8,388,925 B2
(45) Date of Patent: Mar. 5, 2013

(54) METHODS FOR PRODUCING ALUMINUM TRIFLUORIDE

(75) Inventors: Puneet Gupta, Houston, TX (US); Satish Bhusarapu, Houston, TX (US)

(73) Assignee: MEMC Electronic Materials, Inc., St. Peters, MI (US)

(*) Notice: Subject to any disclaimer, the term of this patent is extended or adjusted under 35 U.S.C. 154(b) by 18 days.

(21) Appl. No.: 12/969,058

(22) Filed: Dec. 15, 2010

(65) Prior Publication Data

US 2011/0158896 A1 Jun. 30, 2011

Related U.S. Application Data

(60) Provisional application No. 61/291,141, filed on Dec. 30, 2009.

(51) Int. Cl.
*C01F 7/50* (2006.01)
(52) U.S. Cl. ........ 423/489; 423/495; 423/464; 423/347
(58) Field of Classification Search .............. 423/489, 423/495, 464, 347
See application file for complete search history.

(56) References Cited

U.S. PATENT DOCUMENTS

| | | | |
|---|---|---|---|
| 3,218,124 A | 11/1965 | Oakley, Jr. et al. | |
| 3,385,658 A | 5/1968 | Leverkusen et al. | |
| 3,855,401 A | 12/1974 | Aiso et al. | |
| 3,969,485 A | 7/1976 | Flemmert | |
| 4,041,137 A | 8/1977 | Abe et al. | |
| 4,062,930 A | 12/1977 | Zawadzki et al. | |
| 4,213,952 A | 7/1980 | Sikdar | |
| 4,238,469 A | 12/1980 | Schmidt et al. | |
| 4,348,849 A | 9/1982 | Wollam et al. | |
| 4,446,120 A | 5/1984 | Schmidt et al. | |
| 4,470,959 A | 9/1984 | Talwar et al. | |
| 4,508,689 A | 4/1985 | Bush et al. | |
| 4,632,816 A | 12/1986 | Marlett | |
| 4,748,014 A | 5/1988 | Nanis et al. | |
| 4,889,695 A * | 12/1989 | Bush ........................ | 423/132 |
| 5,558,847 A | 9/1996 | Kaaber et al. | |
| 5,723,097 A | 3/1998 | Barnett et al. | |
| 6,193,944 B1 | 2/2001 | Barnett et al. | |
| 6,217,840 B1 | 4/2001 | Barnett et al. | |
| 2004/0146440 A1 * | 7/2004 | Ignasiak .................... | 423/122 |
| 2010/0189621 A1 | 7/2010 | Revankar et al. | |

FOREIGN PATENT DOCUMENTS

| | | |
|---|---|---|
| CN | 101544374 A | 9/2009 |
| JP | 10231114 A | 9/1998 |
| WO | 2011080657 A2 | 7/2011 |

OTHER PUBLICATIONS

Lisbona et al, "Recovery of fluoride values from spent pot-lining: Precipitation of an aluminium hydroxyfluoride hydrate product", Separation and Purification Technology 61 (2008), pp. 182-192.*
Lisbona et al, "Treatment of Spent Pot-Lining for Recovery of Fluoride Values", Light Metals 2007 Edited by Morten Sorlie TMS (The Minerals, Metals & Materials Society), 2007, pp. 843.*
International Search Report and Written Opinion mailed on Jun. 9, 2011 in International Application No. PCT/IB2010/055927 filed on Dec. 18, 2010.
Co-owned U.S. Appl. No. 12/969,089, filed Dec. 15, 2010.
Perry's Chemical Engineers' Handbook, 7th Ed., 1997, 17-4, Gas-Solid Operations and Equipment, 1 page.
Perry's Chemical Engineers' Handbook, 7th Ed., 1997, 23-49, Gas-Solid Operations and Equipment, 1 page.

* cited by examiner

*Primary Examiner* — Ngoc-Yen Nguyen
(74) *Attorney, Agent, or Firm* — Armstrong Teasdale LLP

(57) ABSTRACT

Methods for producing aluminum trifluoride by acid digestion of fluoride salts of alkali metal or alkaline earth metal and aluminum, optionally, in the presence of a source of silicon; methods for producing silane that include acid digestion of by-products of silane production to produce aluminum trifluoride.

19 Claims, No Drawings

METHODS FOR PRODUCING ALUMINUM TRIFLUORIDE

CROSS-REFERENCE TO RELATED APPLICATIONS

This application claims the benefit of U.S. Provisional Application No. 61/291,141, filed Dec. 30, 2009, which is incorporated herein by reference in its entirety.

BACKGROUND

The present disclosure relates to methods for producing fluoride compounds and, particularly, methods for producing aluminum trifluoride by acid digestion of fluoride salts of alkali metal or alkaline earth metal and aluminum.

Silane is a versatile compound that has many industrial uses. In the semiconductor industry, silane may be utilized for deposition of an epitaxial silicon layer on semiconductor wafers and for production of polycrystalline silicon. Polycrystalline silicon is a vital raw material used to produce many commercial products including, for example, integrated circuits and photovoltaic (i.e., solar) cells that may be produced by thermal decomposition of silane onto silicon particles in a fluidized bed reactor.

Silane may be produced by reacting silicon tetrafluoride with an alkali or alkaline earth metal aluminum hydride such as sodium aluminum tetrahydride as disclosed in U.S. Pat. No. 4,632,816 which is incorporated herein by reference for all relevant and consistent purposes. Production of silane may result in several by-products such as various fluoride salts of alkali metal or alkaline earth metal and aluminum (e.g., $NaAlF_4$, $Na_5Al_3F_{14}$ and $Na_3AlF_6$). Conventionally, these waste products are sold at low prices or are disposed of in a landfill.

Aluminum trifluoride is a versatile material that may be used as a component in an electrolyte melt for production of aluminum and may be used in various fluorination reactions. Aluminum trifluoride is conventionally produced by reacting hydrogen fluoride with relatively expensive alumina or alumina trihydrate. Silicon tetrafluoride is also a versatile material that may be used to produce silane or various halosilanes and can be used for ion implantation, plasma deposition of fluorinated silica, production of pure silica or of silicon nitride and may be used as a metal silicide etch.

A continuing need exists for methods to reuse the wastes produced during silane production to reduce the amount of material that must be landfilled or cheaply sold and to improve the economics of producing silane and resulting commercial products (e.g., photovoltaic cells). A need also exists for methods for producing valuable raw materials such as aluminum trifluoride and silicon tetrafluoride.

SUMMARY

In one aspect of the present disclosure, a method for producing aluminum trifluoride includes contacting a fluoroaluminate feed with an acid to produce aluminum trifluoride and at least one by-product. The feed contains at least about 30% by weight fluoride salts of alkali metal or alkaline earth-metal and aluminum.

In another aspect, a method for producing aluminum trifluoride includes contacting a fluoride salt of alkali metal or alkaline earth-metal and aluminum with an acid to produce aluminum trifluoride and at least one by-product. The aluminum trifluoride is separated from the by-product.

Yet a further aspect of the present disclosure is directed to a method for producing silane and aluminum trifluoride. The method includes contacting silicon tetrafluoride and an alkali or alkaline earth-metal salt of aluminum tetrahydride to produce silane and an effluent. The effluent contains a fluoride salt of alkali metal or alkaline earth-metal and aluminum. The effluent is contacted with an acid to produce aluminum trifluoride and at least one by-product. The aluminum trifluoride is separated from the by-product.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

DETAILED DESCRIPTION

Provisions of the present disclosure include methods for producing fluorides (e.g., aluminum trifluoride or silicon tetrafluoride) by digestion of fluoride salts of alkali metal or alkaline earth metal and aluminum. The digestion reaction may occur in an aqueous environment or in a substantially anhydrous environment. Other provisions include methods for producing silane and fluoroaluminate by-products and use of such by-products for production of a raw material selected from aluminum trifluoride and silicon tetrafluoride.

Generally, the reaction proceeds by contacting a fluoride salt of alkali metal or alkaline earth metal and aluminum with an acid selected from sulfuric acid and hydrochloric acid to produce a fluoride compound (e.g., aluminum trifluoride or silicon tetrafluoride) and various by-products such as hydrogen fluoride and a chloride or sulfate salt of an alkali or alkaline earth-metal. The reaction may proceed in the presence of a source of silicon in which case silicon tetrafluoride is produced. If the reaction occurs in the absence of a source of silicon, aluminum trifluoride is produced.

For purposes of the present disclosure, "fluoride salts of alkali metal or alkaline earth metal and aluminum" include compounds of the general formula $M_xAl_yF_z$, where x, y and z are integers from 1 to 20 or even from 1 to 10 and M is an alkali metal or alkaline earth metal. The fluoride salts may also generally be referred to as "fluoride aluminum salts," "fluoroaluminates" or simply "salts" without departing from the scope of the present disclosure. Generally, the structure of the salt is not essential to the present disclosure and any salts that contain a fluorine atom, aluminum atom and an atom of alkali or alkaline earth metal may be used without limitation. In some embodiments, the fluoride salt used in accordance with the present disclosure include compounds of the general formula $M_xAl_yF_{(2x/p+3y)}$, where M is an alkali or alkaline earth-metal and p is 2 when M is an alkali and p is 1 when M is an alkaline earth-metal.

Without being bound to any particular theory, it is believed that the reaction that occurs when a fluoroaluminate and hydrochloric acid are contacted in the absence of silicon may be represented by the following generic formula,

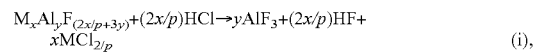

$$M_xAl_yF_{(2x/p+3y)} + (2x/p)HCl \rightarrow yAlF_3 + (2x/p)HF + xMCl_{2/p} \qquad (i),$$

wherein M is an alkali or alkaline earth-metal and p is 2 when M is an alkali and p is 1 when M is an alkaline earth-metal. For instance, when the fluoride salt of aluminum is $NaAlF_4$, the reaction proceeds as follows, $$NaAlF_4 + HCl \rightarrow AlF_3 + HF + NaCl \quad (ii)$$

When the salt is $Na_5Al_3F_{14}$ (also known as chiolite), the reaction proceeds according to reaction (iii), $$Na_5Al_3F_{14} + 5HCl \rightarrow 3AlF_3 + 5HF + 5NaCl \quad (iii)$$

When the salt is $Na_3AlF_6$ (also known as cryolite), the reaction proceeds according to reaction (iv), $$Na_3AlF_6 + 3HCl \rightarrow AlF_3 + 3HF + 3NaCl \quad (iv)$$

When the salt is $Ba_3Al_2F_{12}$, the reaction proceeds according to reaction (v), $$Ba_3Al_2F_{12} + 6HCl \rightarrow 2AlF_3 + 6HF + 3BaCl_2 \quad (v)$$

When the fluoroaluminate is contacted with the acid in the presence of a source of silicon (such as $SiO_2$), it is believed the reaction proceeds as follows, $$M_xAl_yF_{(2x/p+3y)} + (x/2p+3y/4)SiO_2 + (2x/p+3y)HCl \rightarrow (x/2p+3y/4)SiF_4 + (x/p+3y/2)H_2O + xMCl_{2/p} + yAlCl_3 \quad (vi)$$

wherein M and p are defined as above. For instance, when the fluoride salt of aluminum is $NaAlF_4$, the reaction proceeds according to reaction (vii), $$NaAlF_4 + SiO_2 + 4HCl \rightarrow SiF_4 + 2H_2O + NaCl + AlCl_3 \quad (vii)$$

When the salt is $Na_5Al_3F_{14}$, the reaction proceeds according to reaction (viii), $$Na_5Al_3F_{14} + 3.5SiO_2 + 14HCl \rightarrow 3.5SiF_4 + 7H_2O + 5NaCl + 3AlCl_3 \quad (viii)$$

When the salt is $Na_3AlF_6$, the reaction proceeds according to reaction (ix), $$Na_3AlF_6 + 1.5SiO_2 + 6HCl \rightarrow 1.5SiF_4 + 3H_2O + 3NaCl + AlCl_3 \quad (ix)$$

When the salt is $Ba_3Al_2F_{12}$, the reaction proceeds according to reaction (x), $$Ba_3Al_2F_{12} + 3SiO_2 + 12HCl \rightarrow 13SiF_4 + 6H_2O + 3NaCl + 2AlCl_3 \quad (x)$$

While the reactions above are shown using HCl as a starting material, it should be understood that other acids such as sulfuric acid may be used without limitation. In this regard, it is to be noted that the above reactions are made only for the purposes of illustration and should not be viewed in a limiting sense.

An exemplary embodiment of the methods of the present disclosure includes introducing a fluoroaluminate and an acid (e.g., HCl or sulfuric acid) into a reaction vessel optionally with or without a source of silicon. A fluoride product such as aluminum trifluoride ($AlF_3$) or silicon tetrafluoride ($SiF_4$) and several by-products are produced. The fluoride product and the by-products and any unreacted starting materials may be introduced into a purification system to separate the fluoride product and/or purify and isolate by-products.

Reaction Starting Materials

In various embodiments, the fluoroaluminate feed material (synonymously "fluoroaluminate feed," "fluoroaluminate effluent" or simply "effluent") includes an alkali metal or alkaline earth-metal fluoroaluminate. Suitable alkali or alkaline earth-metal fluoroaluminates include lithium fluoroaluminates, sodium fluoroaluminates, potassium fluoroaluminates, magnesium fluoroaluminates, barium fluoroaluminates, calcium fluoroaluminates and mixtures thereof. In view of the wide availability of sodium feedstocks, such as caustic soda and potash, that may be economically reacted to produce sodium aluminum hydride, which may be reacted with silicon tetrafluoride to produce silane, the fluoroaluminate may be a sodium fluoroaluminate produced as a by-product of silane production. More than one fluoroaluminate may be included in the fluoroaluminate feed without departing from the scope of the present disclosure. The fluoroaluminate feed may include at least one of $NaAlF_4$, $Na_5Al_3F_{14}$, and $Na_3AlF_6$, and, in some embodiments, includes a mixture of $NaAlF_4$, $Na_5Al_3F_{14}$ and $Na_3AlF_6$.

The purity of the fluoroaluminate feed is not critically important as unreacted impurities in the feed may be removed during subsequent processing. The fluoroaluminate feed may include an amount of silicon trifluoride, alkali or alkaline earth metal fluoride and/or chloride salts of alkali or alkaline earth-metals and/or aluminum or other impurities. In various embodiments, the fluoroaluminate feed contains less than about 15% by weight impurities on a dry basis or even less than 10% by weight impurities. For purposes of the present disclosure, the term "impurities" refers to compounds other than fluoroaluminates such as, for example, aluminum trifluoride and fluoride salt (e.g., NaF).

The amount of moisture in the fluoroaluminate feed is not critical. Generally, the fluoroaluminate feed may be solid and/or dry (i.e., generally flowable); however, in some embodiments the fluoroaluminate feed is dissolved in a solvent. Generally, if a solvent is used, a solvent other than water is preferred due to low solubility of fluoroaluminates in water. Suitable solvents may be non-polar and include, for example, dimethoxyethane (DME) and toluene. Solid fluoroaluminate feed may contain less than about 5%, less than about 1% or even less than about 0.1% by weight water. The particle size of the fluoroaluminate feed may be relatively small to facilitate solids reactivity; however, the feed material should be sufficiently large to allow the material to be handled without significant difficulty. In one or more embodiments, the particle sizes of the fluoroaluminate feed may be less than about 500 μm and, in other embodiments, less than about 300 μm, from about 100 μm to about 500 μm or from about 200 μm to about 300 μm. In some embodiments, fluoroaluminates are included in an aqueous solution for transport of the material to the reaction vessel (i.e., a sluice-type system may be utilized).

The fluoroaluminate feed may be produced by any of the known methods for producing a fluoroaluminate (or fluoroaluminates if more than one are used) including processes wherein a fluoroaluminate is produced as a by-product. In some embodiments, the fluoroaluminate feed is a by-product of silane production. Silane may be produced by reacting an aluminum hydride (e.g., lithium or sodium aluminum tetrahydride) with silicon tetrafluoride as described below under the section entitled "Production of Silane and Fluoride Product" and in U.S. Pat. No. 4,632,816, which is incorporated herein by reference for all relevant and consistent purposes. Generally, such processes produce a liquid reaction medium with by-product solids (dissolved or slurried) included in the reaction medium. The by-product solids typically include a large amount of fluoroaluminates and may be used as the fluoroaluminate feed of the present disclosure.

The amount of fluoroaluminates in the fluoroaluminate feed may be at least about 30% by weight of the fluoroaluminate feed on a dry basis and, in other embodiments, is at least about 50%, at least about 70%, at least about 80%, at least about 90%, from about 30% to about 95% or from about 70% to about 95% by weight fluoroaluminates by weight of the feed on a dry basis.

Generally, the fluoroaluminate feed is reacted with an acid present in an acid feed stream as more fully described below. Suitable acids include HCl, sulfuric acid or a mixture thereof In certain embodiments, the acid feed stream contains HCl and may contain HCl as the only acid present in the acid feed stream. In embodiments wherein HCl is included in an aqueous solution, the concentration of HCl may be, on a weight basis, at least about 2.5%, at least about 7.5%, at least about 9%, from about 3% to about 20% or from about 3% to about 15% of the aqueous solution. In embodiments wherein sulfuric acid is included in an aqueous solution, the concentration of sulfuric acid may be, on a weight basis, at least about 50%, at least about 75%, at least about 90% or from about 75% to about 99% of the aqueous solution.

A mixture of sulfuric acid and HCl may be used in the acid feed stream. The mixture may contain at least about 10% HCl by weight on a dry basis, at least about 25%, at least about 50%, at least about 75% or even at least about 90% HCl by weight on a dry basis. In certain embodiments, the acid feed contains HCl and not sulfuric acid or may contain sulfuric acid and not HCl.

In other embodiments, the acid is a substantially anhydrous gas stream. "Substantially anhydrous" for the purposes of the present disclosure generally refers to process streams that contain less than about 5% by weight water. In some embodiments, the acid feed contains less than about 1% by weight water or even less than about 0.1% by weight water.

As noted above, a source of silicon may optionally be included in the reaction mixture. The presence of silicon determines the fluoride product (i.e., $SiF_4$ forms in the presence of silicon while $AlF_3$ forms in its absence). Sources of silicon include sand (i.e., $SiO_2$), quartz, flint, diatomite, mineral silicates, metallurgical grade silicon (i.e., a polycrystalline silicon), fumed silica, fluorosilicates and mixtures thereof. Some amount of silicon impurities may be present in the fluoroaluminate feed (e.g., as when the fluoroaluminate feed is a by-product of silane production).

Reaction Conditions

Generally, the reactions of the present disclosure occur upon contacting the fluoroaluminate feed with the acid feed in a reaction vessel so as to suitably form a reaction mixture. The reactions may occur in an aqueous or anhydrous environment as more fully described below.

The molar ratio of acid to fluoroaluminates added to the reaction vessel may be about the stoichiometric ratio which is dependent on the fluoroaluminate starting material and which may be determined from reactions i to x (e.g., 5 moles of acid added per mole of chiolite as in reaction iii). Alternatively, a molar excess of acid may be used (e.g., at least about a 5% molar excess, at least about a 10%, at least about a 25%, at least about a 50%, at least about a 100%, at least about a 250% or even at least about a 500% molar excess of acid). In various embodiments (and depending on the fluoroaluminate starting materials used), the molar ratio of acid (e.g., HCl or sulfuric acid) fed to the reaction vessel to the amount of fluoroaluminates fed to the reaction vessel (or the ratio of the rates of addition as in a continuous system) may be at least about 1:1, at least about 2:1, at least about 3:1, at least about 10:1, at least about 25:1, at least about 50:1 or even at least about 100:1. In some embodiments, the ratio is from about 1:1 to about 100:1, from about 1:1 to about 50:1 or from about 1:1 to about 25:1.

The source of silicon (e.g., sand) may be added to the reaction vessel in a ratio with respect to the fluoroaluminates that is near the stoichiometric ratio. For instance, as shown above in reactions vi to x, the ratio of silicon atoms to fluorine atoms added to the reaction mixture may be about 1:4. Alternatively, silicon may be added in a molar excess. For instance, the molar ratio of silicon to fluorine atoms added to the reaction vessel may be greater than about 1:3.5, greater than about 1:3, greater than about 1:2 or even at least about 1:1. Alternatively or additionally, the molar excess of silicon may be at least about 5%, at least about 10%, at least about 25%, at least about 50%, at least about 100%, at least about 250% or even at least about 500%. In this regard it should be noted that the source of silicon may be added in an amount other than as listed above. Silicon may be added in a ratio less than about stoichiometric such that the reaction product contains both silicon tetrafluoride and aluminum trifluoride (i.e., the reaction results in silicon tetrafluoride when silicon is present and results in aluminum trifluoride when silicon is consumed and not present). Silicon may be added to the reaction vessel separately or may be mixed with the fluoroaluminate feed prior to introduction into the reaction vessel.

i. Aqueous Reaction Systems

In certain embodiments, an aqueous solution of acid is used in the reactor system. The acid may be present in a reaction vessel in which the fluoroaluminate is fed. The acid may be continually fed to the reaction vessel as in a continuous process or a discreet amount of acid may be present as in a batch process. The acid may be fed as an aqueous solution of acid or as a gas that is dissolved into an aqueous solution present in the reactor vessel.

In aqueous reaction systems, the contents of the reaction vessel may be mixed continuously by, for example, mechanical agitation (e.g., impeller or bubbling action). In certain embodiments employing an aqueous reaction system, the temperature of the reaction vessel is at ambient (about 20° C. to about 25° C.) and, alternatively or in addition, the temperature does not need to be controlled during the reaction, i.e., in some embodiments external heat or cooling is not used. In other embodiments, the temperature of the reactor is maintained at a temperature of at least about 100° C., at least about 150° C., at least about 200° C. from ambient to about 300° C., from ambient to about 250° C. or from about 100° C. to about 250° C. Generally, as the concentration of acid increases, the temperature at which the reaction vessel should be maintained to complete the reaction decreases.

The design of the reaction vessel in aqueous systems is generally within the ability of one of ordinary skill in the art and may be dependent on the desired production rates, conversions, operating temperatures and the like. In certain embodiments, the reaction vessel is an agitated tank and, in other embodiments, is a slurry bubble column as described on p. 23-49 of Perry's Chemical Engineers' Handbook, $7^{th}$ Ed. (1997) which is incorporated herein by reference for all relevant and consistent purposes. The slurry bubble column may operate by continuously adding by top or side injection the fluoroaluminate material (either as a powder or slurry) into an aqueous reaction mixture within the column and bubbling in the acid (e.g., via a sparger). The reaction slurry may be removed from the bottom of the column. Alternatively, the slurry bubble column may operate in a batch mode wherein each stream is added to the reactor from the top or side with the acidic gas being added by a bottom sparger. The reaction may occur for a desired residence time and the reaction contents may then be removed from the reactor.

The pressure of the reaction vessel may be about atmospheric or may be maintained at a pressure of at least about 5 bar, at least about 10 bar, at least about 15 bar, from about atmospheric to about 20 bar, from about atmospheric to about 15 bar or from about atmospheric to about 10 bar.

Generally, in batch systems, the reaction is allowed to proceed for at least about 10 minutes, at least about 30 minutes, at least about 60 minutes, at least about 90 minutes, from about 10 minutes to about 120 minutes or from about 15 minutes to about 60 minutes. In continuous systems, the residence time in the reaction vessel may be from about 1 minute to about 60 minutes or even from about 5 minutes to about 30 minutes.

ii. Anhydrous Reaction Systems

In some embodiments, the acid contacted with the fluoroaluminate is a substantially anhydrous gas stream. For instance, substantially anhydrous acid (e.g., substantially anhydrous HCl or sulfuric acid) may be fed to a reaction vessel in which the fluoroaluminate and optionally a source of silicon are suspended such as, for example, a fluidized bed reactor.

The design of the reaction vessel in anhydrous systems is generally within the ability of one of ordinary skill in the art and is dependent on the desired production rates, conversions, operating temperatures and the like. The reaction system may be batch, continuous or semi-batch without departing from the scope of the present disclosure. In embodiments wherein a fluidized bed reactor is used as the reaction vessel, the fluidized bed reactor may generally be a cylindrical vertical vessel; however, any configuration that is acceptable to fluidized bed operations may be utilized. The particular dimensions of the vessel will primarily depend upon system design factors that may vary from system to system such as the desired system output, heat transfer efficiencies and system fluid dynamics, without departing from the scope of the present disclosure.

During operation of the reaction system, the fluidizing gas velocity through the reaction zone of the fluidized bed reactor is maintained above the minimum fluidization velocity of the fluoroaluminate and optionally the source of silicon. The gas velocity through the fluidized bed reactor is generally maintained at a velocity of from about one to about eight times the minimum fluidization velocity necessary to fluidize the particles within the fluidized bed. In some embodiments, the gas velocity is from about two to about five times and may even be about four times the minimum fluidization velocity necessary to fluidize the particles within the fluidized bed. The minimum fluidization velocity varies depending on the properties of the gas and particles involved. The minimum fluidization velocity may be determined by conventional means (see p. 17-4 of Perry's Chemical Engineers' Handbook, 7th. Ed., incorporated herein by reference for all relevant and consistent purposes). Although the present disclosure is not limited to specific minimum fluidization velocities, minimum fluidization velocities useful in the present disclosure range from about 0.7 cm/sec to about 350 cm/sec or even from about 6 cm/sec to about 150 cm/sec.

Gas velocities higher than the minimum fluidization flow rate are often desired to achieve higher productivities. As the gas velocity increases beyond the minimum fluidization velocity, the excess gas forms bubbles, increasing the bed voidage. The bed can be viewed to consist of bubbles and "emulsion" containing gas in contact with silicon particles. The quality of the emulsion is quite similar to the quality of the bed at the minimum fluidization condition. The local voidage in the emulsion is close to the minimum fluidization bed voidage. Hence, bubbles are generated by the gas introduced in excess of what is required to achieve the minimum fluidization. As the ratio of actual gas velocity to the minimum fluidization velocity increases, the bubble formation intensifies. At a very high ratio, large slugs of gas are formed in the bed. As the bed voidage increases with the total gas flow rate, the contact between solids and gases becomes less effective. For a given volume of the bed, the surface area of solids in contact with reacting gases decreases with increasing bed voidage resulting in reduced conversion to the fluoride product. Accordingly, the gas velocity should be controlled to maintain conversion within acceptable levels.

The temperature of the reaction vessel (including embodiments wherein a reaction vessel other than a fluidized bed reactor is used) may be maintained at a temperature of at least about 75° C., at least about 150° C., at least about 200° C., from about 75° C. to about 300° C. or from about 75° C. to about 200° C. The heat that is used to maintain the reaction zone at such temperatures may be provided by conventional heating systems such as electrical resistance heaters disposed on the exterior of the reactor vessel wall. The reaction vessel may operate at pressures from about 1 bar to about 20 bar or from about 1 bar to about 10 bar. The residence time in the reactor may be less than about 10 minutes, less than about 5 minutes or even less than about 1 minute.

Generally, in both aqueous and anhydrous systems for producing the fluoride product, conversion of the fluoroaluminate to the fluoride product may be at least about 50%, and, in other embodiments, at least about 60%, at least about 75%, at least about 90%, or even at least about 95% (e.g., from about 50% to about 98%, from about 60% to about 98% or from about 75% to about 98%).

It should be noted that any reactor capable of carrying out the above described reactions may be used without departing from the scope of the present disclosure. Furthermore, the process of embodiments of the present disclosure may be conducted in continuous or batch systems and may be carried out in a single reaction vessel or may incorporate one or more reaction vessels configured in series or in parallel.

Recovery of Fluoride Product and By-Product Treatment

The methods of the present disclosure generally involve preparation of a fluoride product (e.g., aluminum trifluoride and/or silicon tetrafluoride) with one or more by-products. The various products and by-products of the reactions described above are illustrated in Table 1 and described more fully below. The equipment and methods to separate and purify the fluoride product (e.g., aluminum trifluoride or silicon tetrafluoride) may generally be selected from any of the equipment and methods known and available to one of ordinary skill in the art without limitation. Anhydrous systems are generally simpler to operate than aqueous systems as anhydrous systems do not involve slurry treatment operations; however anhydrous systems may involve a controlled particle size distribution of the fluoroaluminate feed (and source of silicon if any) and may involve higher processing temperatures.

TABLE 1

Products and By-products Produced in Anhydrous and Aqueous Systems and in the Presence and Absence of Silicon

| | Aqueous; No Silicon Present | Aqueous; Silicon Present | Anhydrous; No Silicon Present | Anhydrous; Silicon Present |
|---|---|---|---|---|
| Fluoride Product | $AlF_3$ (slurried) | $SiF_4$ (g) | $AlF_3$ (s) | $SiF_4$ (g) |
| Solid or Slurried By-products | Salt | Salt | Salt | Salt |
| Liquid By-products | HF (Dissolved) Salt (Dissolved) | HF (Dissolved) Salt (Dissolved) | — | — |
| Gaseous By-products | HF $H_2$ | HF $F_3SiOSiF_3$ | HF $H_2$ | HF |

In aqueous systems that do not contain a source of silicon, after completion of the reaction, the reaction mixture contains an amount of aluminum trifluoride product that is slurried in the reaction mixture. A salt of the acid (e.g., alkali or alkaline earth-metal chloride or sulfate) is typically also present as a slurried solid and/or is dissolved in the aqueous reaction mixture. The reaction also may produce an amount of hydrogen fluoride which may be dissolved in the reaction mixture or may be drawn from the reaction mixture in an effluent gas. This effluent gas may also contain an amount of hydrogen gas and unreacted and vaporized acid.

The liquid reaction mixture containing slurried fluoride product may be introduced into a solid-liquid separation unit to produce a solid fraction containing the aluminum trifluoride product and a salt of the acid (e.g., chloride and/or sulfate salt) and a liquid fraction containing hydrogen fluoride, a salt of the acid and an amount of unreacted acid. Solid-liquid separation units are generally known in the art and include, for example, centrifuges, decanters, filters (e.g., sieve screens) and the like.

To separate the solid aluminum trifluoride product from the salt, the solid fraction may be introduced into one or more wash units. Generally, the salt is more soluble in water than the aluminum trifluoride product. The wash unit generally operates by contacting the fluoride/salt solid fraction with water for a sufficient amount of time to allow the salt to dissolve into the aqueous phase. The salt-enriched water may then be separated from the slurried aluminum trifluoride product by a second solid-liquid separation unit for product recovery. This second solid-liquid separation unit may form part of the wash unit itself. A number of wash units may be used and the wash units may be arranged in series or parallel without limitation. The spent wash water may be processed (e.g., by drying such as flash drying) to recover the salt which may be sold commercially or further processed as described below.

Aluminum trifluoride product may be dried to remove any remaining water by the addition of extraneous heat and/or reduction in pressure to remove additional water and/or acid from the product. Suitable drying temperatures are at least about 50° C., at least about 100° C., at least about 130° C., from about 50° C. to about 150° C. or from about 100° C. to about 150° C.

In this regard it should be noted that when aluminum trifluoride is produced as a fluoride product, the aluminum trifluoride may be present in a number of hydrated forms. Without being bound to any particularly theory, it is believed that aluminum trifluoride solid (e.g., filter cake) that is dewatered in the solid-liquid separation device is in the trihydrate form, $AlF_3 \cdot 3H_2O$. Further it is believed that drying results in dehydration of the product and formation of at least one of the mono-hydrate, semi-hydrate or even anhydrous form of aluminum trifluoride.

The liquid fraction separated from the solid fraction in the solid-liquid separation device and the effluent gas removed from the reaction vessel may be introduced into a distillation column to remove and separate one or more of the unused acid, hydrogen fluoride and hydrogen gas. The design and operation of distillation methods are generally within the skill of one of ordinary skill in the art and are dependent on various factors including the composition of the feed, the desired recovered product(s), the desired recovery and the like. Unreacted acid may be recycled back to the reaction vessel in continuous systems.

In anhydrous systems in which silicon is not present such as, for example, a fluidized bed operation in which an anhydrous acid gas is bubbled through a fluidized bed of fluoroaluminate material, the reaction produces solid aluminum trifluoride product which may be withdrawn from the reactor. The product particulate may include an amount of solid by-product salt (e.g., NaCl, $NaHSO_4$ or $Na_2SO_4$) which may be separated out as described below. Hydrogen fluoride and hydrogen gas may be generated as gaseous by-products that are withdrawn from the reaction vessel with unreacted acid.

In such anhydrous systems in which silicon is not present, the particulates that typically include aluminum trifluoride product and salt may be introduced into one or more wash units to separate the salt from the aluminum trifluoride product. The wash units may be similar to the wash units described above for aqueous systems. After washing, the solid product may be dried to at least partially dehydrate the fluoride product as described above. The spent gas that is removed from the reaction vessel may be subjected to distillation to recover at least one of unreacted acid, hydrogen fluoride and hydrogen gas.

In both aqueous and anhydrous systems, when silicon is present in the reaction vessel and is available for reaction, silicon tetrafluoride gas is produced as a product. In aqueous systems, a salt of the acid may be slurried within the reaction mixture as a by-product. In such aqueous systems, the reaction also may produce an amount of hydrogen fluoride which may be dissolved in the reaction mixture and/or may be withdrawn from the reaction mixture with the product gas. This product gas may also contain an amount of vaporized acid and/or $F_3SiOSiF_3$ by-product.

In anhydrous systems that contain a source of silicon, the solid fluoroaluminate decomposes into particulate salt (e.g., NaCl, $NaHSO_4$ or $Na_2SO_4$) during the reaction. Hydrogen fluoride may be generated as a gaseous by-product that is withdrawn from the reaction vessel with any unreacted acid and silicon tetrafluoride. In both aqueous and anhydrous systems that produce silicon tetrafluoride product gas, the silicon tetrafluoride gas may be separated from the other gases by distillation, acid baths (e.g., sulfuric acid bath to remove unreacted HF) and/or adsorption units (e.g., a zinc-based adsorber to remove acid) which may be operated in any combination and number and may be operated in series or parallel without limitation. Silicon tetrafluoride product gas may be condensed for storage as a liquid product and/or may be further processed by, for example, reaction with an alkali or alkaline earth-metal aluminum tetrahydride for the production of silane.

In certain embodiments and regardless of whether aqueous or anhydrous acid is used and regardless of whether the reaction occurs in the presence of silicon, hydrogen fluoride by-product may suitably be reacted with a source of silicon to produce silicon tetrafluoride gas. Hydrogen fluoride may be separated from other gases in a distillation column. In this regard it should be noted that it is not necessary to remove the unreacted acid from the hydrogen fluoride as the acid does not interfere with production of silicon tetrafluoride. The hydrogen fluoride may be introduced into a reaction vessel in which a source of silicon (e.g., sand) is present such as a packed bed or fluidized bed to produce silicon tetrafluoride. The silicon tetrafluoride gas may be washed with sulfuric acid to remove further by-product gases and may be introduced into an adsorber, preferably with zinc media, to remove any unreacted acid.

Dissolved chloride or sulfate salts (e.g., present in the reaction solution and/or dissolved during washing operations) may be recovered by drying. Such drying operations typically vaporize any unreacted acid present in the solution which allows the acids to be recovered for re-use. Recovered by-product chloride or sulfate salts may be commercially sold or may be reacted with fluorosilicic acid to regenerate the starting acids (HCl or sulfuric acid) and produce fluorosilicates which may be used as starting materials for the production of the fluoride products of the present disclosure (e.g., silicon tetrafluoride). For instance, the fluorosilicates may be used as the source of silicon to produce silicon tetrafluoride.

Production of Silane and Fluoride Product

The fluoride production methods described above may generally be incorporated into a process for producing silane such that the by-products of silane production may be used to generate value-added products. In one or more exemplary embodiments, silicon tetrafluoride is contacted with an alkali or alkaline earth-metal salt of aluminum tetrahydride to produce silane and an effluent that contains one or more fluoroaluminates. As described above, the fluoroaluminate may be contacted with an acid to produce aluminum trifluoride (in the absence of silicon) or silicon tetrafluoride (in the presence of silicon) and at least one by-product which may be separated from the fluoride product.

Silicon tetrafluoride starting material may be produced by evaporating solutions of fluorosilicic acid. Alternatively or in addition, a portion of the silicon tetrafluoride that is reacted with aluminum tetrahydride to produce silane may be generated from the methods described above. Alkali or alkaline earth-metal salts of aluminum tetrahydride may be produced by reacting their elemental precursors (Na, Al and H) under high pressure and temperature.

Production of silane is generally described in U.S. Pat. No. 4,632,816 which is incorporated herein by reference for all relevant and consistent purposes. Gaseous silicon tetrafluoride may be introduced into an agitated liquid reaction medium containing aluminum tetrahydride salt. The liquid reaction medium may include solvents selected from polyethers (e.g., diglyme, monoglyme or dioxane), hydrocarbons (e.g., toluene or pentane) and mixtures thereof. The reaction mixture may be maintained from about 30° C. to about 80° C. and atmospheric pressure may be used. The reaction mixture may also be maintained at higher pressures such as pressures up to about 100 atm. In some embodiments, the reaction medium is maintained at a pressure of from about 1 to about 10 atm.

Stoichiometric amounts of silicon tetrafluoride and aluminum tetrahydride may be used to produce silane; however, in some embodiments a molar excess of tetrahydrides is used to suppress formation of by-products. The reaction may be performed batch-wise or continuously such as in a continuous back-mixed reactor or in a slurry bubble column.

The reaction generates silane gas and slurried fluoroaluminate salt. The fluoroaluminates may be separated from the reaction medium by means generally known in the art such as by use of solid-liquid separation units (centrifuges, decanters, filters and the like). Upon separation, the fluoroaluminates may be introduced to a reaction vessel with acid to a produce the fluoride product (aluminum trifluoride or silicon tetrafluoride) as described above.

EXAMPLES

Example 1

Production of Aluminum Trifluoride by Hydrochloric Acid Digestion of Fluoroaluminates with Continuous Exhaustion of Generated Gas A solid mixture (15.7 g) of sodium aluminum fluoride ($NaAlF_4$), chiolite ($Na_5Al_3F_{14}$) and cryolite ($Na_3AlF_6$) ("fluoroaluminate mixture") was mixed with silica (8 g). The solids mixture was then mixed in a TEFLON beaker containing aqueous hydrochloric acid (243 g at 36 wt %). The initial mole ratio of hydrochloric acid to the fluoroaluminate mixture was 20:1. A magnetic stirrer was placed at the bottom of the beaker for mechanical agitation of the mixture. The beaker was at an ambient pressure of 1 bar and at an ambient temperature of 20° C. The fluoroaluminate powder reacted violently with aqueous hydrochloric acid to produce fumes ($SiF_4$) that were exhausted continuously. The mixture was agitated for 45 minutes when the grayish slurry of the fluoroaluminate mixture and aqueous hydrochloric acid completely turned to a whitish slurry. The liquid in the slurry was decanted and the resulting solids mixture was dried under a lamp to yield 27.3 g of solids. Analysis of dry solids indicated the loss in the fluorine moles to be 11%, which on weight basis was equivalent to the gain in the chlorine moles. Based on stoichiometry, the conversion from fluoroaluminates to aluminum trifluoride semi-hydrate and hydrogen fluoride was estimated to be approximately 60%.

Example 2

Production of Aluminum Trifluoride by Hydrochloric Acid Digestion of Fluoroaluminates in an Enclosed Vessel A fluoroaluminate mixture (24.7 g) was mixed with 36 wt % hydrochloric acid in an enclosed digestion vessel made of TEFLON. The vessel and the contents were heated to 150° C. and the relief valve on the vessel was set to release at 100 psig. After 30 minutes of heating, the contents of the vessel were cooled to ambient and the relief valve was opened. The loss in the weight of the vessel or the gas released was 0.11 g. The liquid in the digestion vessel was decanted and the solids mixture was dried under a lamp. The solids yield on drying was 28%. The resulting solids were washed with water and dried again. The yield of solids on the second drying was 64%. Based on stoichiometry, the conversion of fluoroaluminate to aluminum trifluoride semi-hydrate was 93%.

When introducing elements of the present disclosure or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above apparatus and methods without departing from the scope of the disclosure, it is intended that all matter contained in the above description and shown in the accompanying figures shall be interpreted as illustrative and not in a limiting sense.

What is claimed is:

1. A method for producing aluminum trifluoride, the method comprising:
    contacting a fluoride salt of alkali metal or alkaline earth-metal and aluminum with an acid in the absence of a source of silicon to produce aluminum trifluoride and at least one by-product, the acid being selected from hydrochloric acid, sulfuric acid and mixtures thereof; and
    separating the aluminum trifluoride from the by-product.

2. The method as set forth in claim 1 wherein the fluoroaluminate feed comprises at least about 70% by weight fluoride salts of alkali metal or alkaline earth-metal and aluminum.

3. The method as set forth in claim 1 wherein the fluoride salt of alkali metal or alkaline earth-metal and aluminum is selected from the group consisting of $NaAlF_4$, $Na_5Al_3F_{14}$, $Na_3AlF_6$ and mixtures thereof.

4. The method as set forth in claim 1 wherein hydrogen fluoride and a chloride or sulfate salt of alkali or alkaline earth-metal are produced as by-products.

5. The method as set forth in claim 4 wherein the hydrogen fluoride is contacted with a source of silicon to produce silicon tetrafluoride.

6. The method as set forth in claim 1 wherein the fluoride salt is a by-product of silane production.

7. The method as set forth in claim 1 wherein the contacting step comprises contacting the fluoride salt of alkali metal or alkaline earth-metal and aluminum with the acid that is in aqueous form in a reaction vessel to produce a slurry containing the aluminum trifluoride and the at least one by-product.

8. The method as set forth in claim 7 wherein the slurry is introduced into a solid-liquid separation unit to produce a solid fraction containing the aluminum trifluoride and a liquid fraction containing at least one by-product.

9. The method as set forth in claim 8 wherein the solid fraction contains aluminum trifluoride and a chloride or sulfate salt of an alkali metal or alkaline earth-metal and the liquid fraction contains water, hydrogen fluoride, unreacted acid and a chloride or sulfate salt of an alkali metal or alkaline earth-metal.

10. The method as set forth in claim 9 comprising introducing the solid fraction into a wash unit to separate the aluminum trifluoride from the chloride or sulfate salt.

11. The method as set forth in claim 9 comprising separating at least one of water, hydrogen fluoride and unreacted acid in a distillation column.

12. The method as set forth in claim 1 wherein the contacting step comprises contacting the fluoride salt of alkali metal or alkaline earth-metal and aluminum with the acid that is substantially anhydrous and the fluoride salt is introduced to a fluidized bed reactor which contains the acid as a fluidizing gas.

13. The method as set forth in claim 12 wherein particulate aluminum trifluoride and a chloride or sulfate salt of alkali or alkaline earth-metal are produced in the fluidized bed reactor.

14. The method as set forth in claim 13 comprising introducing the particulate aluminum trifluoride and the chloride or sulfate salt into a wash unit to separate the aluminum trifluoride from the salt.

15. The method as set forth in claim 13 wherein a spent gas is produced, the spent gas comprising hydrogen, hydrogen fluoride and unreacted acid.

16. The method as set forth in claim 15 comprising separating at least one of hydrogen, hydrogen fluoride and unreacted acid from the spent gas in a distillation column.

17. The method as set forth in claim 1 wherein aluminum trifluoride hydrate is produced.

18. The method as set forth in claim 17 wherein the aluminum trifluoride hydrate is dried to form aluminum trifluoride semi-hydrate.

19. The method as set forth in claim 1 wherein the fluoride salt is a particulate with an average nominal diameter of less than about 500 μm.

* * * * *